(12) United States Patent
Kim

(10) Patent No.: US 7,142,870 B2
(45) Date of Patent: Nov. 28, 2006

(54) APPARATUS AND METHOD FOR DISPLAYING DIRECTION AND POSITION INFORMATION OF PORTABLE TERMINAL

(75) Inventor: Hyung-Chul Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 390 days.

(21) Appl. No.: 10/262,689

(22) Filed: Oct. 2, 2002

(65) Prior Publication Data

US 2003/0096623 A1 May 22, 2003

(30) Foreign Application Priority Data

Nov. 21, 2001 (KR) ............................... 2001-72589

(51) Int. Cl.
*H04Q 7/20* (2006.01)
(52) U.S. Cl. ............................... 455/456.1; 455/414.2; 455/457; 455/446
(58) Field of Classification Search ............ 455/456.1, 455/456.2, 456.3, 456.6, 457, 566, 414.2, 455/427, 13.1, 13.3, 446, 448; 701/207, 701/211, 214, 208, 200; 342/359, 357.08, 342/357.1; 340/995.17, 995.24, 988
See application file for complete search history.

(56) References Cited

U.S. PATENT DOCUMENTS 5,379,320 A * 1/1995 Fernandes et al. .......... 375/141
6,073,076 A * 6/2000 Crowley et al. ............ 701/208
6,101,443 A * 8/2000 Kato et al. .................. 701/210
6,347,278 B1 * 2/2002 Ito .......................... 342/357.08
6,377,211 B1 * 4/2002 Hsiung ....................... 342/359
6,687,610 B1 * 2/2004 Hashida ...................... 701/207

FOREIGN PATENT DOCUMENTS

CN 08-221512 8/1996

* cited by examiner

Primary Examiner—Edward F. Urban
Assistant Examiner—John J. Lee
(74) Attorney, Agent, or Firm—Dilworth & Barrese LLP

(57) ABSTRACT

An apparatus and method for displaying direction and position information of a portable terminal, wherein geographic position information of the portable terminal itself is displayed on the basis of a compass direction and a global positioning system (GPS). The portable communication apparatus comprises a base station for detecting and transmitting position information of the portable terminal corresponding to received GPS positioning information thereof, and a portable communication device including a sensor for detecting a true north direction of the portable terminal, the portable communication device transmitting the GPS positioning information of the portable terminal, which is received from at least one GPS satellite, to the base station, correcting an azimuth angle of the position information for display of the portable terminal, based on information of the true north direction of the portable terminal detected by the sensor, and displaying corrected position and direction information of the portable terminal.

11 Claims, 5 Drawing Sheets

APPARATUS AND METHOD FOR DISPLAYING DIRECTION AND POSITION INFORMATION OF PORTABLE TERMINAL

PRIORITY

This application claims priority to an application entitled "APPARATUS AND METHOD FOR DISPLAYING DIRECTION AND POSITION INFORMATION OF PORTABLE TERMINAL", filed in the Korean Industrial Property Office on Nov. 21, 2001 and assigned Serial No. 2001-72589, the contents of which are hereby incorporated by reference.

BACKGROUND OF THE INVENTION

1. Field of the Invention

The present invention relates to an apparatus for geographic information display, and more particularly to an apparatus and method for displaying direction and position information of a portable terminal, wherein geographic position information of the portable terminal itself is displayed on the basis of a compass direction and a global positioning system (GPS).

2. Description of the Related Art

When people travel to unfamiliar cities, mountains, islands, oceans or so forth, they may not fully enjoy the freedom to travel because they don't know their way around well. For this reason, a traveler must require at a local tourist information center or be fully aware of travel information about the region before embarking upon traveling in an unknown region. However, the tourist information center cannot provide perfect information about topographic and planimetric features of the region. In addition, for example, in the case of climbing a high and difficult mountain, the traveler is liable to be disoriented due to his/her strange surroundings. In this regard, it can be said that tourist information or a map itself cannot ensure smooth traveling.

As an alternative, it is possible to utilize a navigation system that includes a CD-ROM, which stores map information and a GPS receiver. However, such a system is bulky and usually hard to carry. Also, a GPS receiver having a display device, without the CD-ROM information may be used in traveling. The GPS receiver has a problem in that it has no functionality of providing a traveler with exact direction information indicating the four compass directions while the traveler is moving. In addition, the GPS receiver cannot provide a third person with geographic position information about a site where the traveler having experienced an accident is located, causing a problem in being rescued.

Currently, with the development of the communications industry, common personal portable communication terminals, for example, portable terminals such as cellular phones, CDMA or PCS based mobile telephones, and personal digital assistants (PDA), may be used for detecting position information in an easy manner and transmitting the position information to a remote rescue center. In the United States, a portable terminal is defined to basically provide position information for Emergency 911 use, and next, such a function will be applied to all portable communication terminals. Meanwhile, Cellular Communication Industry Association (CTIA) defines such a function of Automatic Position Identification (ALI) of portable communication terminals, recommended by Federal Communication Commission (FCC). According to the definition, a terminal with a GPS receiver is required to provide accuracies of 50 m for 67% of emergency calls and 150 m for 95% of calls.

However, even such a portable communication terminal with the GPS receiver fails to provide accurate direction information about the four compass directions from the current site. This is caused by the fact that a GPS signal transmitted from a GPS satellite does not contain the direction information. The portable communication terminal having the GPS receiver built therein can simply transmit GPS-created information, which can be easily recognized only by a E911 center, to a rescue center or a control center which needs the position information. Namely, the portable communication terminal does not display an image of a substantial map, accurate position information and the like. For this reason, it is anticipated that the utility of such a terminal for travel and tourism purposes and the like, is low.

SUMMARY OF THE INVENTION

Therefore, the present invention has been made in view of the above problems, and it is an object of the present invention to provide an apparatus and method for displaying direction and position information of a portable terminal, which is handy to carry due to its small size and can display current direction and geographic position information of the portable terminal.

It is another object of the present invention to provide an apparatus and method for displaying direction and position information of a portable terminal, which displays information of a map and compass direction of a site where a user is currently located.

In accordance with one aspect of the present invention, the above and other objects can be accomplished by providing an apparatus for displaying direction and position information of a portable terminal, comprising a base station for detecting and transmitting position information for display of the portable terminal corresponding to received GPS positioning information thereof, and a portable communication device including a sensor for detecting a true north direction of the portable terminal, the portable communication device transmitting to the base station, the GPS positioning information of the portable terminal, which is received from at least one GPS satellite, correcting an azimuth angle of the position information of the portable terminal, based on information of the true north direction of the portable terminal detected by the sensor, and displaying corrected position and direction information of the portable terminal.

The portable communication apparatus may include a RF transmission/reception unit for transmitting and receiving data between the base station and the portable communication device, a display unit for visually displaying image data, a direction sensor for detecting the specific direction of the portable terminal in response to an enable signal, a GPS receiver for receiving the GPS positioning information of the portable terminal which is received from at least one GPS satellite, and a control unit for, transmitting in response to setting of a compass function, the received GPS positioning information to the base station via the RF transmission/reception unit, correcting the azimuth angle which is received from the base station, of the position information of the portable terminal, based on the information of the specific direction of the portable terminal detected by the sensor, and transferring corrected position and direction information of the portable terminal to the display unit.

The base station may operate through the steps of analyzing the received GPS positioning information of the portable terminal and calculating position coordinate values thereof, comparing fixed position coordinate values of the base station with the calculated position coordinate values of the portable terminal, providing the position information for display of the portable terminal, and transmitting to the portable communication device the position information for display, on which information of a virtual true north direction of the portable terminal is marked.

Preferably, the control unit functions to shift the position information which is transmitted from the base station for display of the portable terminal so as to match the virtual north direction of the position information for display thereof, with the north direction of the portable terminal, which is detected by the sensor.

In accordance with one aspect of the present invention, the above and other objects can be accomplished by providing a method for displaying direction and position information comprising a base station for detecting and transmitting position information for display of the portable terminal corresponding to received GPS positioning information thereof, and a portable communication device including a sensor for detecting a true north direction of the portable terminal and a GPS receiver, the method comprising the steps of receiving the GPS positioning information of the portable terminal, transmitting the received GPS positioning information to the base station and receiving position information of the portable terminal corresponding to thereto, correcting an azimuth angle of the position information for display, based on information of the true north direction of the portable terminal, and displaying corrected position and direction information of the portable terminal.

Preferably, the base station functions through the steps of analyzing the received GPS positioning information of the portable terminal and calculating position coordinate values thereof, comparing fixed position coordinate values of the base station with the calculated position coordinate values of the portable terminal, providing the position information of the portable terminal, and transmitting to the portable communication device the position information for display, on which information of a virtual true north direction of the portable terminal is indicated.

In addition, it is more preferable that the step of displaying the corrected position and direction information includes the step of shifting the position information of the portable terminal to match the virtual north direction of the position information, which is transmitted from the base station, with the north direction of the portable terminal, which is detected by the sensor.

Thus, according to the invention as configured above, the portable communication device receives GPS positioning information from at least one GPS satellite and transmits the information to the base station. Then, the portable communication device receives from the base station the position information for display with calculated coordinate values of the portable terminal, corrects the position information for display to match the direction obtained from the direction sensor built therein, and displays the corrected position and direction information of the portable terminal. As a result, a user can exactly recognize direction and map information of a site where the user is currently located. Further, an operation staff residing in the base station can accurately recognize the site where the user of the portable communication device is located. The portable communication device of the invention has an additional advantage in that an immediate rescue for people traveling mountainous areas is made possible.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
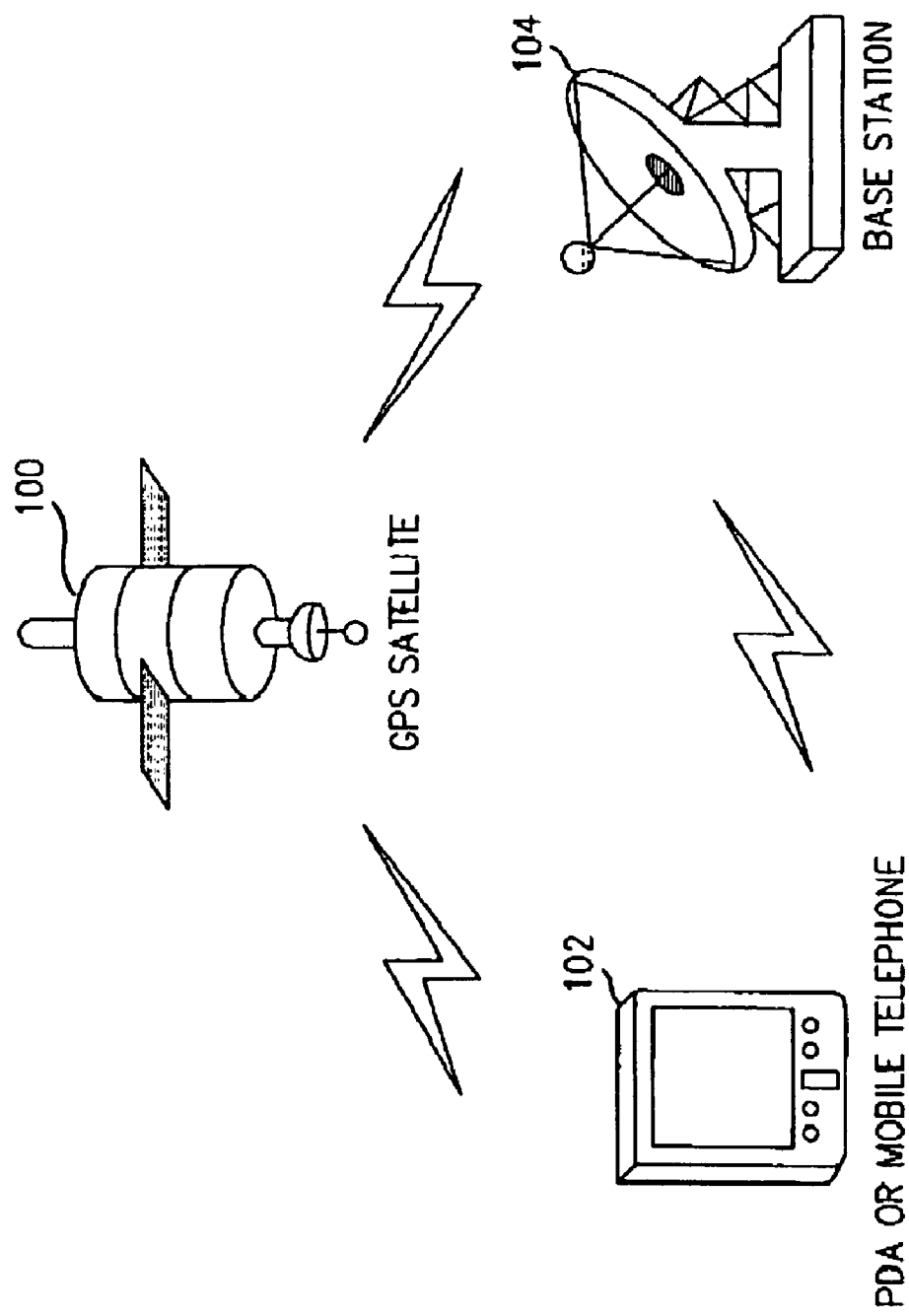
FIG. 1 is a schematic view showing a system for displaying position information of a portable terminal in accordance with a preferred embodiment of the invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may cloud the subject matter of the present invention.

FIG. 1 is a schematic view showing a system for displaying position information in a portable terminal in accordance with a preferred embodiment of the invention. Referring to FIG. 1, a portable terminal 102 for example, a portable telephone or PDA, receives GPS positioning information which is received from a GPS satellite 100, via a GPS receiver contained in patentable terminal 102. Such GPS positioning information received from the GPS satellite 100 is already well known in the art, so is not further described in detail herein. The GPS positioning information of the portable terminal is transmitted via a reverse channel from the portable terminal 102 to a base station 104.

Meanwhile, the base station 104 receives the GPS positioning information of its own position from the GPS satellite 100, thereby having information of its own position coordinates. The GPS positioning information about both the base station itself and the portable terminal is analyzed and calculated at the base station 104. The position coordinates of base station 104 may be obtained from the GPS satellite 100, as above. The coordinate values of the base station are fixed, and stored in a data storage medium such as a memory. The base station 104 having its own position coordinate values calculates geographic position information of the portable terminal 102, corresponding to information of GPS measurements of the portable terminal 102, which is received from the portable terminal 102.

In other words, the position coordinate values of both the base station itself and the portable terminal are calculated using a previously set algorithm. A distance and direction between the base station and the portable terminal 102 are calculated by comparing the position coordinate values of the portable terminal with those of the base station itself. Access to position information of the portable terminal corresponding to the geographic position information calculated in the above way about a site where the portable terminal 102 is located, for example, map information, is achieved through the data storage medium (not illustrated). On the accessed map information the calculated direction information (that is, position coordinate values) is marked, and the information is transmitted to the portable terminal 102. The direction information marked on the position information refers to information of a virtual north direction which is virtually set. Such information of the virtual north direction may be obtained by calculating the distance between the portable terminal 102 and the base station and comparing the position coordinate values of the portable terminal and the base station itself. Further, the position information for display transmitted to the portable terminal 102 includes information about topographic and planimetric features located in directions left, right, upward, and downward around the virtual north where the portable terminal 102 is located, thereby providing a character display service thereof.

The portable terminal 102 stores position information for display, which is transmitted from the base station 104, in the internal memory and then transfers it to a display unit, thereby displaying current direction information and map information.

Therefore, the portable terminal 102 receives the geographic position information of the current site thereof from the GPS satellite 100, while the base station 104 analyzes the geographic position information of the portable terminal 102. The base station 104 transmits to the portable terminal 102 position and direction information of the portable terminal corresponding to the geographic position information. The portable terminal 102 then can display the information. As a result, a user of the portable terminal can easily recognize the map and direction information about a site where the user is located.

The technical scope of the invention can be easily understood by the following description with reference to FIGS. 2 to 5, in which these operations are illustrated in more detail.

Figure 2:
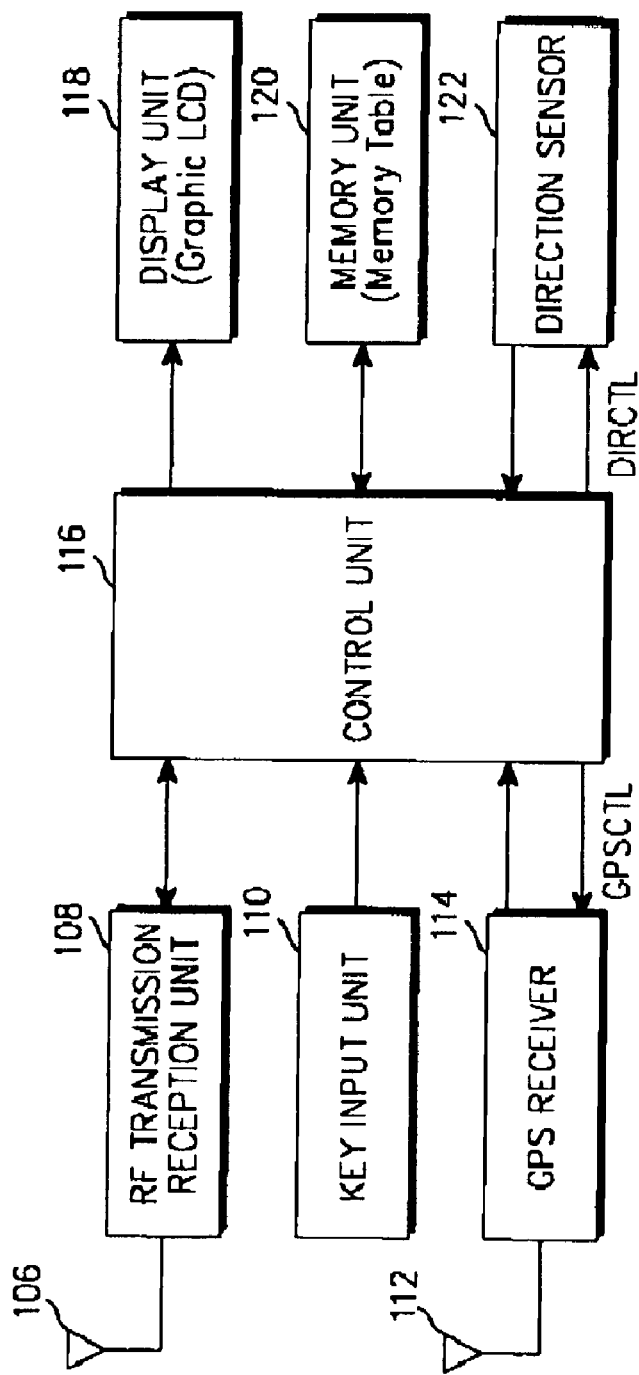
FIG. 2 is a block diagram illustrating an apparatus for displaying position information of a portable terminal in accordance with a preferred embodiment of the invention.

FIG. 2 is a block diagram illustrating an apparatus for displaying position information of a portable terminal in accordance with a preferred embodiment of the invention. In FIG. 2, the reference numeral 106 denotes an RF transmission/reception antenna of the portable terminal 102, the reference numeral 108 denotes a RF transmission/reception unit, and the reference numeral 110 denotes a key input unit including keys for at least setting a compass function or a personal navigation function. In addition, the reference numeral 114 denotes a GPS receiver for selectively receiving the GPS band signal among the signals received via a GPS antenna 112 and demodulating GPS positioning information. The GPS receiver 114 is designed to operate in response to activation of a control signal GPSCTL, while not operating in response to inactivation of the control signal GPSCTL, thereby consuming little power. The reference numeral 116 denotes a control unit for controlling the entire operation of the portable terminal 102. For example, the control unit 116 is adapted to execute a call connection function of typical CDMA or PCS phones and a user interface (UI) function corresponding to a key signal from the key input unit 110. Also, connected to the control unit 116 is a direction sensor 122 which is selectively activated when a compass function is set through the UI. The reference numeral 118 denotes a display unit including a graphic LCD, and functions to visually display the position information outputted from the control unit 116. Finally, the reference numeral 120 denotes a memory unit for temporarily storing programs for various operations of the portable terminal 102 and the processed data. The memory unit 116 includes memories, for example, a flash memory and random access memory (RAM).

Figure 3:
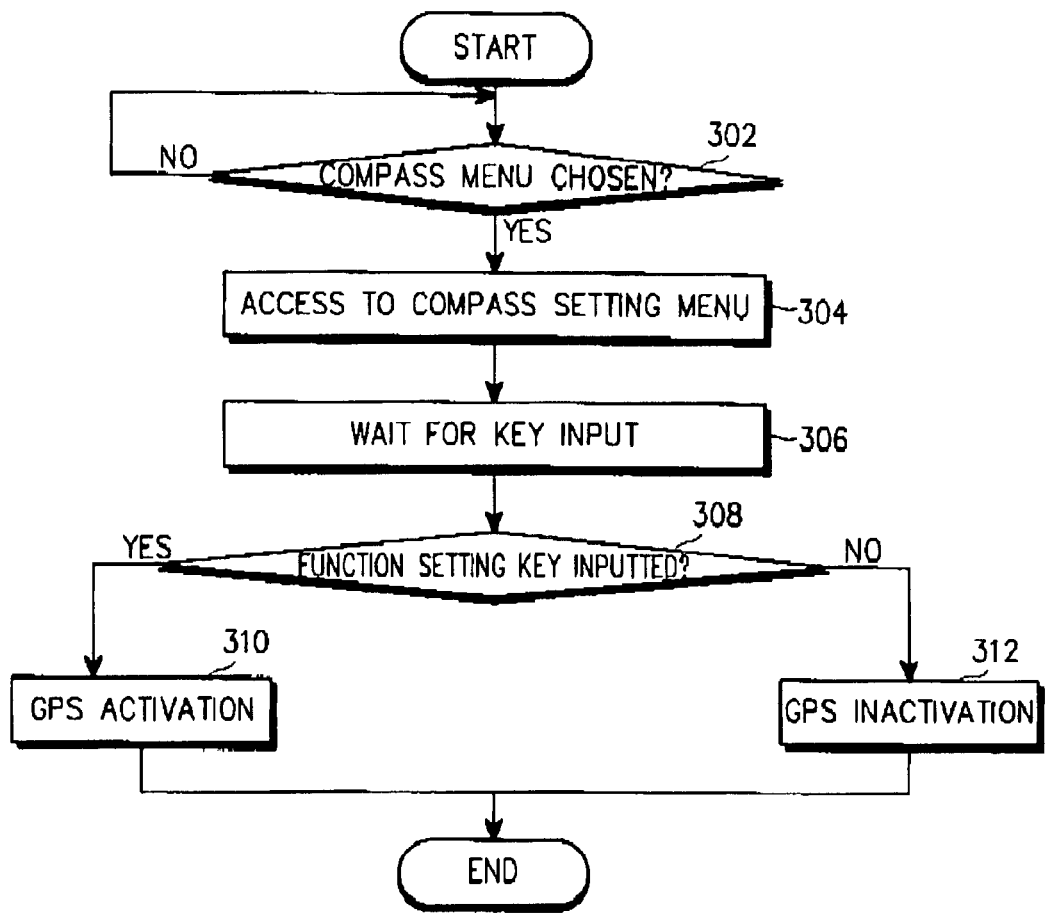
FIG. 3 is a flow chart illustrating a procedure of controlling a user interface function for displaying position information in accordance with a preferred embodiment of the invention, in which a function of displaying position information in a portable terminal is set.

FIG. 3 is a flow chart illustrating a procedure of controlling a user interface function for displaying position information in accordance with a preferred embodiment of the invention, in which a position information display function in a portable terminal is set. Such a UI program is programmed in the memory unit 120.

Figure 4:
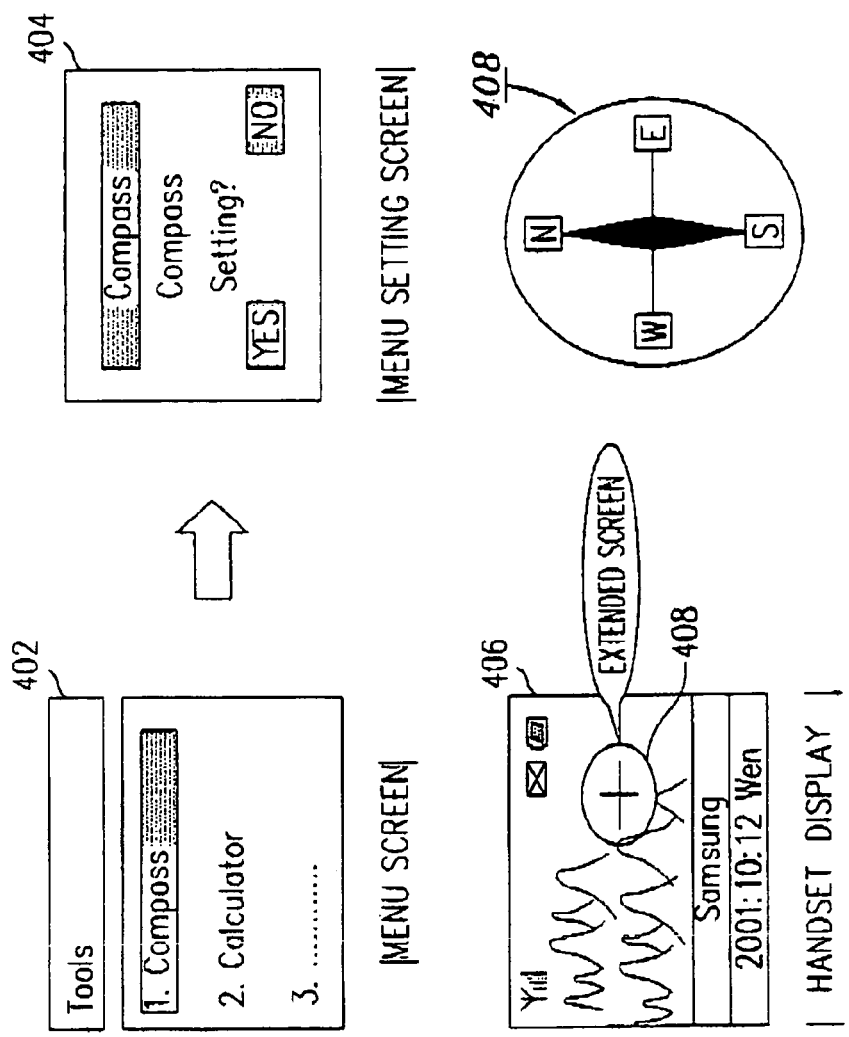
FIG. 4 is a view illustrating an operation state of a user interface function and a displayed state of position information in a portable terminal, in accordance with a preferred embodiment of the invention.

FIG. 4 is a view illustrating an operation state of a user interface and a displayed state of position information in a portable terminal, in accordance with a preferred embodiment of the invention. In this drawing, a menu display state upon operation of the UI is shown. Also shown is an example of displaying information about a geographic position (map) and a direction (compass), upon receiving the position information for display.

Figure 5:
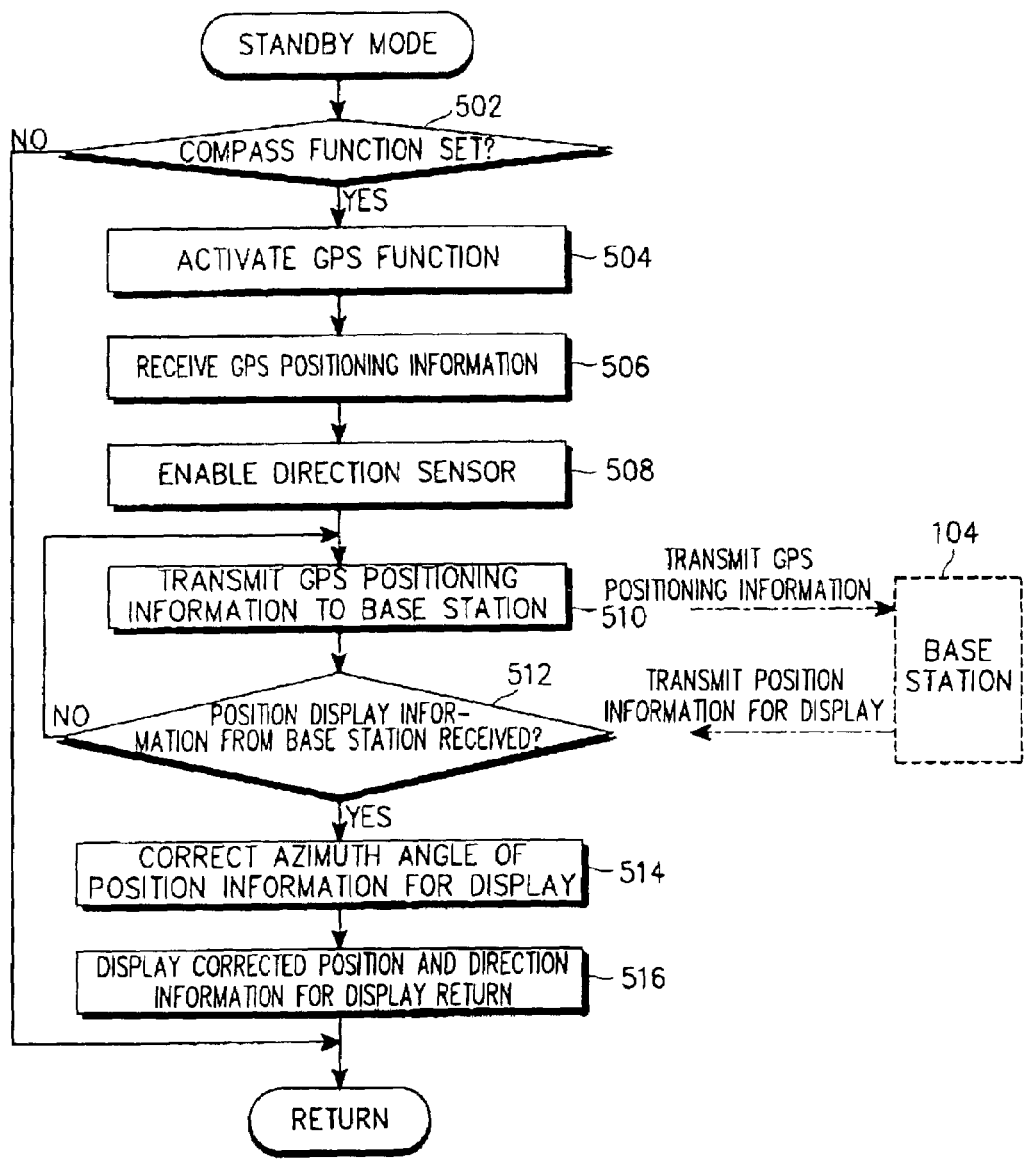
FIG. 5 is a flow chart illustrating a control procedure of determining and displaying position information in a portable terminal in accordance with a preferred embodiment of the invention.

FIG. 5 is a flow chart illustrating a control procedure of determining and displaying position information in a portable terminal in accordance with a preferred embodiment of the invention. Namely, in this drawing, there is illustrated a procedure of controlling the portable terminal when the compass function is set through the UI.

As the portable terminal 102 shown in FIG. 2 operates, it first monitors various operating states in a standby mode. In such a situation, the user can enter a menu key or a compass key mounted on the key input unit 110, to set the compass function implemented by the invention. If it is determined that the compass menu has been chosen, at step 302 in FIG. 3, the control unit 116 accesses certain graphic data from the memory unit 120, at step 304 in FIG. 3, to display a compass setting menu, as shown by the reference numeral 402 in FIG. 4, thus displaying the menu on the display unit 118. The control unit 116 waits for a key input at step 306 in FIG. 3.

When a screen showing a menu tool is displayed as in the reference numeral 402 in FIG. 4, the user can press an enter key after moving a menu bar to the compass menu using a menu arrow key or a up/down key mounted on the key input unit 110. As a result, the control unit 116 transfers a message to question whether the compass function should be set, as in the reference numeral 404 in FIG. 4, to the display unit 118. The control unit detects the input of a function setting key at step 308 in FIG. 3. According to the user's choice, the control unit 116 performs a step 310 or 312, thereby activating or inactivating the GPS control signal GPSCTL, being transferred to the GPS receiver 114. The GPS control signal GPSCTL, functions to supply a power voltage for the GPS receiver 114 and control an enabling state thereof. If GPSCTL is inactivated, the power voltage for the GPS receiver 114 is interrupted. In the above way, the user can easily set the compass function in the portable terminal 102, using the UI program shown in FIG. 3.

Through the above steps in which the compass function is set in the portable terminal 102, the control unit 116 being in standby mode scans at regular time intervals to determine whether the compass function has been set at step 502 in FIG. 5. When it is determined that the compass function has been set, at step 504, the GPS control signal GPSCTL, which is transferred to the GPS receiver 114, is maintained at an activation state. The GPS receiver 114 demodulates the received GPS signal which is received via the antenna due to an input of the activated GPS control signal GPSCTL, and transfers the GPS positioning information to the control unit 116. For such a GPS receiver 114, a conventional GPS receiver which is already well known in the art may be used.

The control unit 116 stores the GPS positioning information outputted from the GPS receiver 14 in a memory region such as an internal register at step 506 in FIG. 5, and activates a control signal DIRCTL at step 508 to enable the direction sensor 122. At this time, the direction sensor 122 detects the direction in response to activation of the control signal DIRCTL. For example, a true north direction from a current position is detected, and the detection signal is transferred to the control unit 116. For such a direction sensor 122, diverse units may be used. For example, a typical electronic compass may be used. That is, a magnetic sensor may be used. Also, it is apparent that a person with average skill in the art can easily implement such a direction sensor, using a variety of sensors in addition to the magnetic sensor. After inputting the detection signal of the true north direction, which is detected from the direction sensor 122, the control unit 116 displays direction information by transferring the compass information to the display unit 118, as shown in the reference numeral 406 in FIG. 4. This is represented in more detail as the reference numeral 408 in FIG. 4. As indicated by the reference numeral 406 or 408 in FIG. 4, such display of a compass image, which is displayed on the display unit 118, is controlled to represent the true north, and if necessary, it can represent 16 compass points.

After performing the step 508 in FIG. 5, the control unit 116 transfers the GPS positioning information which is received and stored, to the base station 104 at step 510. At step 512, the control unit 116 scans to determine whether position information of the portable terminal 102 is received from the base station 104.

The base station 104 computes the received GPS measurement information of the portable terminal using the algorithm which is previously set, and calculates the position coordinate values. The base station 104, as described before, calculates a distance and direction between the base station itself and the portable terminal 102, and accesses map information of the periphery of a site where the portable terminal 102 is located, from the data storage medium. At this time, as previously described, the virtual north information, which is virtually set, is marked on the map information. Thus, it should be recognized that such an access is achieved based on such virtual north. Moreover, the map information includes data for a character display service to provide information about topographic and planimetric features located in left, right, upward, and downward directions, centering on the virtual north from the site where the portable terminal 102 is located. The position information of the portable terminal 102 corresponding to the geographic position information thereof, which are obtained by the base station 104, is transmitted to the portable terminal 102, being transferred to the control unit 116, via the antenna 106 and the RF transmission/reception unit 108 in FIG. 2.

At this time, if it is determined that the position information for display has been received at step 512 in FIG. 5, the control unit 116 in the portable terminal 102 corrects an azimuth angle of the received position information for display at step 514. The azimuth angle of the received position information for display is corrected to match with the azimuth angle detected by the direction sensor 122, by shifting or rotating the graphic map information to match the virtual north direction which is marked on the received position display information with the true north direction which is detected by the direction sensor 122. That is, the virtual north direction of the position information for display, which is transmitted from the base station 104, is corrected to the true north direction, which is detected by the direction sensor 122. Then, the control unit 116 transfers the data to the display unit 118 at step 516, thereby such data being presented to the user of the portable terminal 102. In other words, the position and direction information for display having the corrected direction are transferred to the display unit 118, displaying the map information and direction information showing the topographical features, as shown in the reference numeral 406 in FIG. 4. The direction information displayed is shown as the reference numeral 408 in FIG. 4.

Therefore, the user who carries the portable terminal 102 according to the present invention, can recognize at one time the map information and direction information about the current site where the user is located. Owing to this, the user can hike or climb a mountain in a safe and fearless manner, and further can benefit from the services provided by a personal portable navigation device.

As apparent from the above description, according to the present invention, the portable terminal can offer direction information by adding a compass function, and map information including a direction, owing to communication between a GPS satellite and a base station. Therefore, the user can get such information from the portable terminal in an easy manner, thereby being very useful while traveling sites unfamiliar or climbing high and difficult mountains.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for displaying direction and position information of a portable communication device having an RF transmission/reception unit for transmitting and receiving data between a base station and the portable communication device, comprising:

a base station having a processor for:
    receiving GPS position information from the portable communication device and calculating geographic position information corresponding to the received GPS position information; and
    transmitting to the portable communication device position information including corresponding virtual azimuth angle information, the position information corresponding to the geographic position information; and the portable communication device comprising:
a sensor for detecting a compass direction of the portable terminal;
a GPS receiver for receiving from at least one GPS satellite the GPS position information of the portable terminal;
a control unit for:
    transmitting the received GPS position information to the base station;
    receiving the position information from the base station; and
    correcting the orientation of the position information using the virtual azimuth angle information and the compass direction; and
a display unit for displaying corrected position information and the compass direction.

2. The apparatus as set forth in claim 1, wherein the portable communication device further detects the specific direction of the portable terminal in response to an enable signal.

3. The apparatus as set forth in claim 2, wherein the GPS receiver operates in response to an active control signal.

4. The apparatus as set forth in claim 3, wherein the direction sensor detects any one direction selected from the group consisting of north, south, east and west directions.

5. The apparatus as set forth in claim 4, wherein the control unit activates the control signal transferred to the GPS receiver in response to setting of the compass function.

6. The apparatus as set forth in claim 5, wherein the control unit transfers graphic data of a compass submenu to the display unit in response to a choice of a compass menu, and selectively activates the GPS receiver upon activation of the compass function.

7. A method for displaying direction and position information of a portable terminal, comprising the steps of:
receiving at the portable terminal GPS positioning information of the portable terminal;
transmitting from the portable terminal the received GPS positioning information to a base station and receiving from the base station position information corresponding to the GPS positioning information, the position information including geographic position information of the portable terminal and virtual azimuth angle information;
correcting the position information based on information corresponding to a specific direction of the portable terminal; and
displaying corrected position information and direction information of the portable terminal;
wherein the step of displaying the corrected position information and direction information includes the step of shifting the position information of the portable terminal to match the virtual specific direction of the position information, which is transmitted from the base station, with the specific direction of the portable terminal, which is detected by a direction sensor.

8. The method as set forth in claim 7, further comprising the steps of:
displaying a submenu for setting a compass function in response to a choice of a compass menu; and
activating operation of the GPS receiver upon activation of the compass function.

9. The method as set forth in claim 8, further comprising the step of activating operation of the GPS receiver if the compass function is set, and enabling the direction sensor for detecting the specific direction of the portable terminal.

10. The method as set forth in claim 9, wherein the base station performs the steps of:
analyzing the received GPS positioning information of the portable terminal and calculating position coordinate values thereof;
comparing fixed position coordinate values of the base station with the calculated position coordinate values of the portable terminal for providing the position information; and
transmitting the position information to the portable terminal.

11. A method for displaying direction and position information of a portable terminal, comprising the steps of:
receiving at the portable terminal GPS positioning information of the portable terminal;
transmitting from the portable terminal the received GPS positioning information to a base station and receiving from the base station position information of the portable terminal corresponding to the GPS positioning information;
correcting an azimuth angle of the position information based on information of the specific direction of the portable terminal;
displaying corrected position and direction information of the portable terminal;
analyzing at the base station the received GPS positioning information of the portable terminal and calculating position coordinate values thereof;
comparing at the base station fixed position coordinate values of the base station with the calculated position coordinate values of the portable terminal for providing the position information of the portable terminal; and
transmitting from the base station the position information, to the portable terminal.

* * * * *